US006765665B2

(12) United States Patent
Heffner et al.

(10) Patent No.: US 6,765,665 B2
(45) Date of Patent: Jul. 20, 2004

(54) OPTICAL BIT RATE DETECTOR

(75) Inventors: Brian Lee Heffner, Los Altos, CA (US); Robert R. McLeod, Morgan Hill, CA (US)

(73) Assignee: JDS Uniphase Corporation, San Jose, CA (US)

( * ) Notice: Subject to any disclaimer, the term of this patent is extended or adjusted under 35 U.S.C. 154(b) by 114 days.

(21) Appl. No.: 10/274,804

(22) Filed: Oct. 21, 2002

(65) Prior Publication Data

US 2003/0081200 A1 May 1, 2003

Related U.S. Application Data

(60) Provisional application No. 60/348,329, filed on Oct. 26, 2001.

(51) Int. Cl.[7] ................................................. G01J 1/00
(52) U.S. Cl. ............................. 356/213; 356/229; 398/9
(58) Field of Search ............................... 356/213–232, 356/73.1; 398/9, 25, 27, 161, 212; 714/704, 705

(56) References Cited

U.S. PATENT DOCUMENTS 4,989,201 A * 1/1991 Glance .......................... 398/95
5,513,029 A * 4/1996 Roberts ......................... 398/32
6,266,172 B1   7/2001 Zirngibl ......................... 359/189
6,580,531 B1 * 6/2003 Swanson et al. ................ 398/5

* cited by examiner

Primary Examiner—Hoa Q. Pham
(74) Attorney, Agent, or Firm—Allen, Dyer, Doppelt Milbrath & Gilchrist, P.A.

(57) ABSTRACT

The invention relates to a simple and relatively inexpensive way of determining the optical bit rate of an optical signal, which is based on the fact that different percentages of the signal will be transmitted through a narrow-band optical filter depending on the bit rate. Increasing the bit rate of an optical signal results in a broadening of the channel spectrum, therefore, if the optical filter is designed with a passband thinner than all (or all but one) of the channel widths, then signals with different bit rates will have distinctive amounts of transmitted light relative to the amount of input light. In the preferred embodiment the optical signal is divided into two sub-beams by a beam splitter, and one of the sub-beams is passed through the optical filter. The power of filtered sub-beam is compared to the power of the unfiltered sub-beam to provide a ratio, which is compared to one or more predetermined values indicative of the bit rate. The optical filter is preferably a Fabry-Perot etalon with a periodic response tuned to the ITU grid.

20 Claims, 3 Drawing Sheets

OPTICAL BIT RATE DETECTOR

CROSS-REFERENCE TO RELATED APPLICATIONS

The present invention claims priority from U.S. patent application Ser. No. 60/348,329 filed Oct. 26, 2001.

TECHNICAL FIELD

The present invention relates to, an optical bit rate detector, and in particular to an optical bit rate detector that differentiates between known modulation rates.

BACKGROUND OF THE INVENTION

Optical networks currently support signals with various modulation rates, e.g. 10 GB/s (OC192), 5 GB/s (OC96), 2.5 GB/s (OC48) and 1.25 GB/s (OC 24). Accordingly, there exists a need for a device with the ability to detect the bit rate of a received signal. To determine the absolute modulation rate would require a very high-resolution optical spectrum analyzer or the combination of a high-speed-receiver and an electrical spectrum analyzer. Both of these options require large and expensive equipment. U.S. Pat. No. 6,266,172 issued Jul. 24, 2001 in the name of Martin Zirngibl discloses an optical bit rate measurement device that alleviates the need for expensive spectrum analyzers. However, the Zirngibl device requires complicated electrical circuitry for separating, delaying, multiplying, and integrating electrical signals to generate an autocorrelation function.

An object of the present invention is to overcome the shortcomings of the prior art by providing a simple inexpensive optical bit rate detector that determines the optical bit rate of a signal by the amount of the signal passed through a narrow band optical filter.

SUMMARY OF THE INVENTION

Accordingly, the present invention relates to an optical bit rate detector device for determining the optical bit rate of an input optical signal comprising:

a beam splitter for dividing the input optical beam into first and second sub-beams;

an optical filter disposed to receive the first sub-beam;

a first photo-detector for measuring the optical power of the first sub-beam after passing through the optical filter;

a second photo-detector for measuring the optical power of the second sub-beam; and circuit means for comparing the optical power of the first and second sub-beams to determine the bit rate of the input optical signal.

Another aspect of the present invention relates to a method of determining the optical bit rate of an optical signal comprising the steps of:

a) determining an initial power measurement of the optical signal;

b) passing at least a portion of the optical signal through an optical filter;

c) determining a secondary power measurement of the optical signal passing through the optical filter; and d) comparing the initial power measurement with the secondary power measurement and determining the optical bit rate of the signal based of the comparison.

Another feature of the present invention provides A device for determining the optical bit rate of an optical signal comprising:

first power measuring means for obtaining a measure of the optical signal's initial power;

an optical filter for filtering at least a portion of the optical signal resulting in a filtered signal;

second power measuring means for obtaining a measure of the filtered signal's power; and bit rate determining means for determining the bit rate of the optical signal based on the measure of the initial power and the filtered signal's power.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
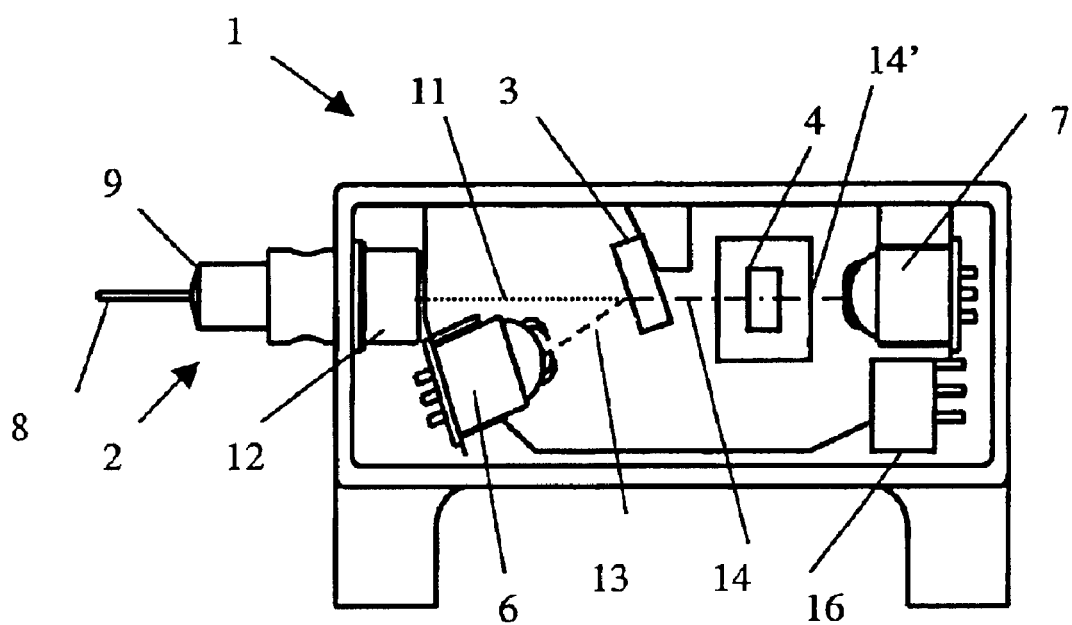
FIG. 1 is a plan view of the optical bit rate detector according to the present invention.

With reference to FIG. 1, an optical bit detector, generally indicated at 1, includes an input port 2, a beam splitter 3, an optical filter 4, a first photodiode detector 6 and a second photodiode detector 7. The input port 2 receives an end of an optical fiber 8, encased in a fiber tube ferrule 9. An input optical signal 11 is launched into the detector 1 from the fiber 8 and collimated by a collimating lens 12 onto the beam splitter 3. The input optical signal is divided into two sub-beams 13 and 14, one of which is directed to the first photodiode detector 6, while the other sub-beam is directed to the optical filter 4. The portion of the second sub-beam 14 that is transmitted through the optical filter 4 is directed to the second photodiode detector 7.

Figure 2:
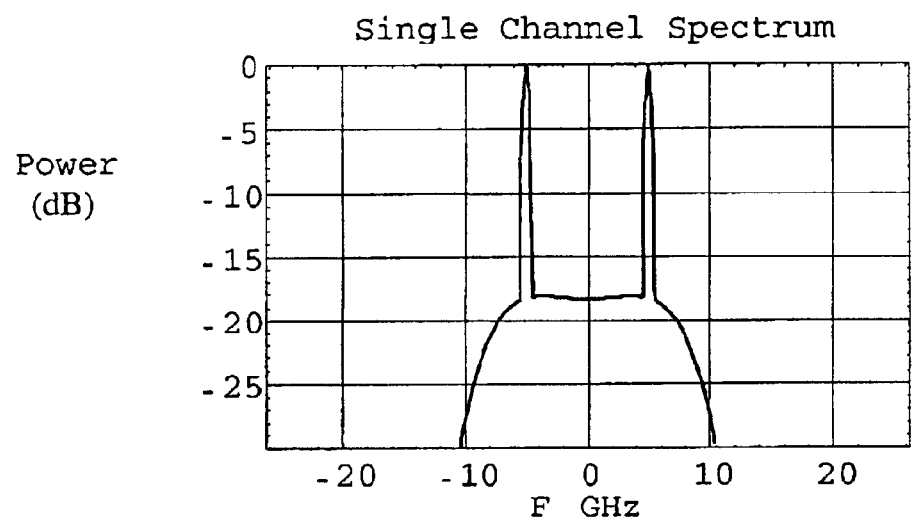
FIG. 2 is a typical 10 GB/s single channel optical spectrum.

A typical 10 GB/s optical spectrum is illustrated in FIG. 2, while a typical 2.5 GB/s optical spectrum (not shown) would be similar, but with approximately one quarter of the width, i.e. the higher the bit rate the broader the spectrum of the single channel.

The optical filter 4 is selected to provide a different insertion loss to a signal with a first modulation rate, e.g. 10 GB/s, than a signal with a second modulation rate, e.g. 2.5 GB/s. For example, a filter with a spectral width of 4 GHz, e.g. a thin film filter or a Bragg grating, will pass the second signal with very little attenuation, while the much wider 10 GB/s signal will be attenuated a great deal. Accordingly, the optical filter 4 is designed to attenuate signals with the various bit rates differently. One possibility is to have a filter with a bandpass width smaller than all (or all but one) of the signals to be measured.

If the input power of the signal is known or constant for each signal, then the first photodiode detector 6 is unnecessary, and the bit rate can be determined simply by the amount of optical power transmitted through the optical filter 4. However, the present invention is designed for use anywhere in the system regardless of the input power by utilizing the ratio between the power of the first sub-beam 13 and the power of the filtered second sub-beam 14'. The ratio of the power of the first sub-beam 13 to the power of the filtered second sub-beam 14' will be constant throughout the system, but different for signals with different modulation rates because the second sub-beam 14 at each bit rate will be attenuated differently by the optical filter 4.

Circuitry 16 is electrically connected to both the first and second photodiode detectors 6 and 7 for calculating the ratio of the photocurrents representative of the power from the first and the filtered second sub-beams 13 and 14', respectively. This ratio is then compared to a predetermined value or table of values indicative of the bit rate. Again, if the input power is predetermined, the circuitry 16 will simply compare the power reading from the second photodiode detector 7 against a table of values to determine the bit rate.

Figure 3:
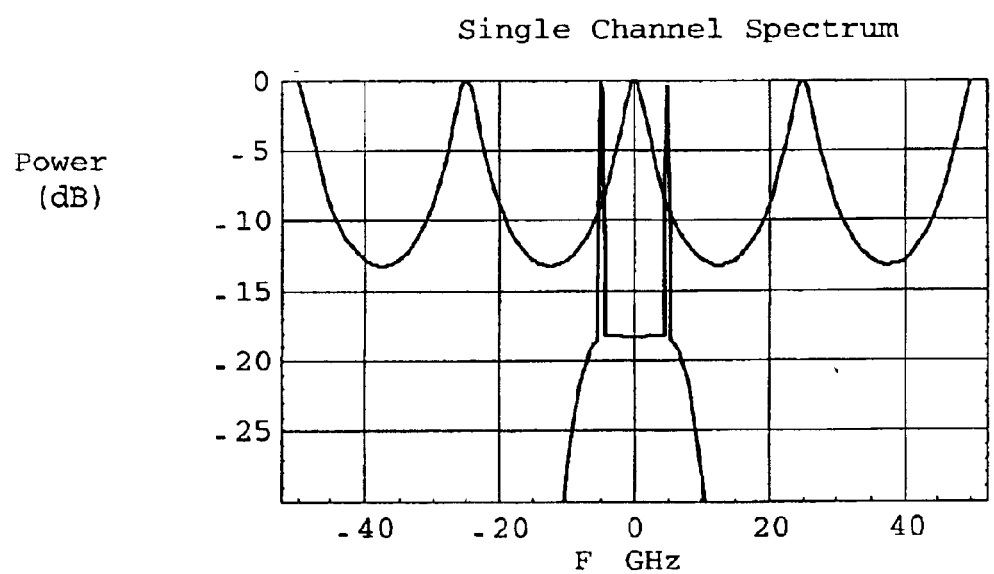
FIG. 3 is the spectrum of FIG. 2 compared with a transmission of a 25 GHz Fabry-Perot etalon.

The optical filter 4 is preferably a Fabry-Perot (FP) etalon, which provides a periodic transmission tuned to the channels on the ITU grid, as illustrated in FIG. 3. Matching the FP etalon to the ITU grid enables the present invention to provide bit rate information for any channel in a system with a channel spacing or 25 GHz or multiples thereof.

Figure 4:
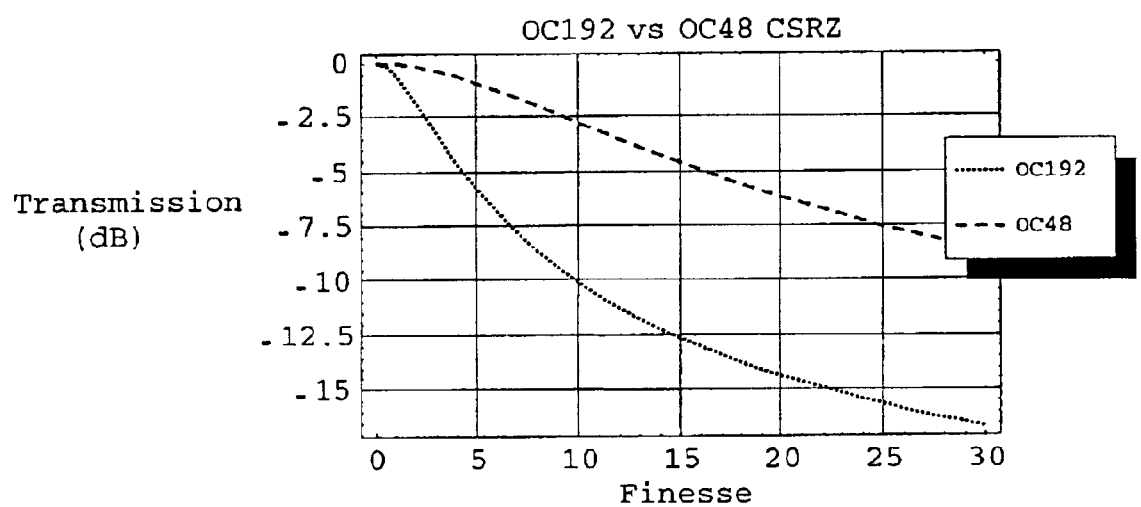
FIG. 4 illustrates the transmission of two different bit rates through a Fabry-Perot etalon vs the finesse of the Fabry-Perot etalon.

FIG. 4 illustrates the transmission for a 2.5 GB/s signal and for a 10 GB/s signal as a function of etalon finesse. As is evident from the graph, the difference between the transmission is over 6 dB for all etalons with a finesse of 6 or more. Accordingly, expensive high finesse etalons are not required for the present invention to function effectively.

We claim:

1. An optical bit rate detector device for determining the optical bit rate of an input optical signal comprising:
    a beam splitter for dividing the input optical beam into first and second sub-beams;
    an optical filter disposed to receive the first sub-beam;
    a first photo-detector for measuring the optical power of the first sub-beam after passing through the optical filter;
    a second photo-detector for measuring the optical power of the second sub-beam; and
    circuit means for comparing the optical power of the first and second sub-beams to determine the bit rate of the input optical signal.

2. The device according to claim 1, wherein the optical filter is a narrow-band, periodic optical filter.

3. The device according to claim 2, wherein the optical filter is a Fabry-Perot etalon.

4. The device according to claim 3, wherein the etalon has a periodic response matching the ITU grid.

5. The device according to claim 1, wherein the circuit means determines a ratio of the optical power of the first photo detector to the optical power of the second photo detector; and wherein the circuit means compares the determined ratio to a predetermined value indicative of the corresponding bit rate.

6. A method of determining the optical bit rate of an optical signal comprising the steps of:
    a) determining an initial power measurement of the optical signal;
    b) passing at least a portion of the optical signal through an optical filter;
    c) determining a secondary power measurement of the optical signal passing through the optical filter; and
    d) comparing the initial power measurement with the secondary power measurement and determining the optical bit rate of the signal based on the comparison.

7. The method according to claim 6, wherein step a) includes separating the optical signal into a first sub-beam and a second sub-beam, and measuring the optical power of the first sub-beam.

8. The method according to claim 7, wherein step b) includes passing the second sub-beam through the optical filter resulting in a filtered second sub-beam.

9. The method according to claim 8, wherein step c) includes measuring the optical power of the filtered second sub-beam after passing through the optical filter.

10. The method according to claim 9, wherein step d) includes determining a ratio of the optical power from the filtered second sub-beam to the first sub-beam.

11. The method according to claim 10, wherein step d) includes comparing the ratio to a predetermined value to determine the bit rate of the optical signal.

12. The method according to claim 10, wherein step d) includes comparing the ratio to a predetermine set of values to determine the bit rate of the optical signal.

13. The method according to claim 9, wherein step b) includes passing the second sub-beam through a Fabry-Perot etalon.

14. The method according to claim 13, wherein the etalon has a periodic response matching the ITU grid.

15. A device for determining the optical bit rate of an optical signal comprising:
    first power measuring means for obtaining a measure of the optical signal's initial power;
    an optical filter for filtering at least a portion of the optical signal resulting in a filtered signal;
    second power measuring means for obtaining a measure of the filtered signal's power; and bit rate determining means for determining the bit rate of the optical signal based on the measure of the initial power and the filtered signal's power.

16. The device according to claim 15, wherein the first power measuring means includes: a beam splitter for dividing the optical signal into a first sub-beam and a second sub-beam; and a first photo detector for obtaining a measure of the first sub-beam's optical power.

17. The device according to claim 16, wherein the filtered signal comprises the second sub-beam after passage through the optical filter resulting in a filtered second sub-beam; and wherein the second power measuring means comprises a second photo detector for obtaining a measure of the filtered second sub-beam's optical power.

18. The device according to claim 17, wherein the bit rate determining means determines a ratio of the optical power of the filtered second sub-beam to the optical power of the first sub-beam; and wherein the bit rate determining means compares the ratio to one or more predetermined values corresponding to different bit rates.

19. The device according to claim 15, wherein the optical filter comprises a Fabry-Perot etalon.

20. The device according to claim 19, wherein the etalon has a periodic response matching the ITU grid.

* * * * *